May 19, 1931. W. McCONNELL 1,806,407
SHOCKING ATTACHMENT FOR GRAIN BINDERS
Filed Aug. 20, 1929   4 Sheets-Sheet 2
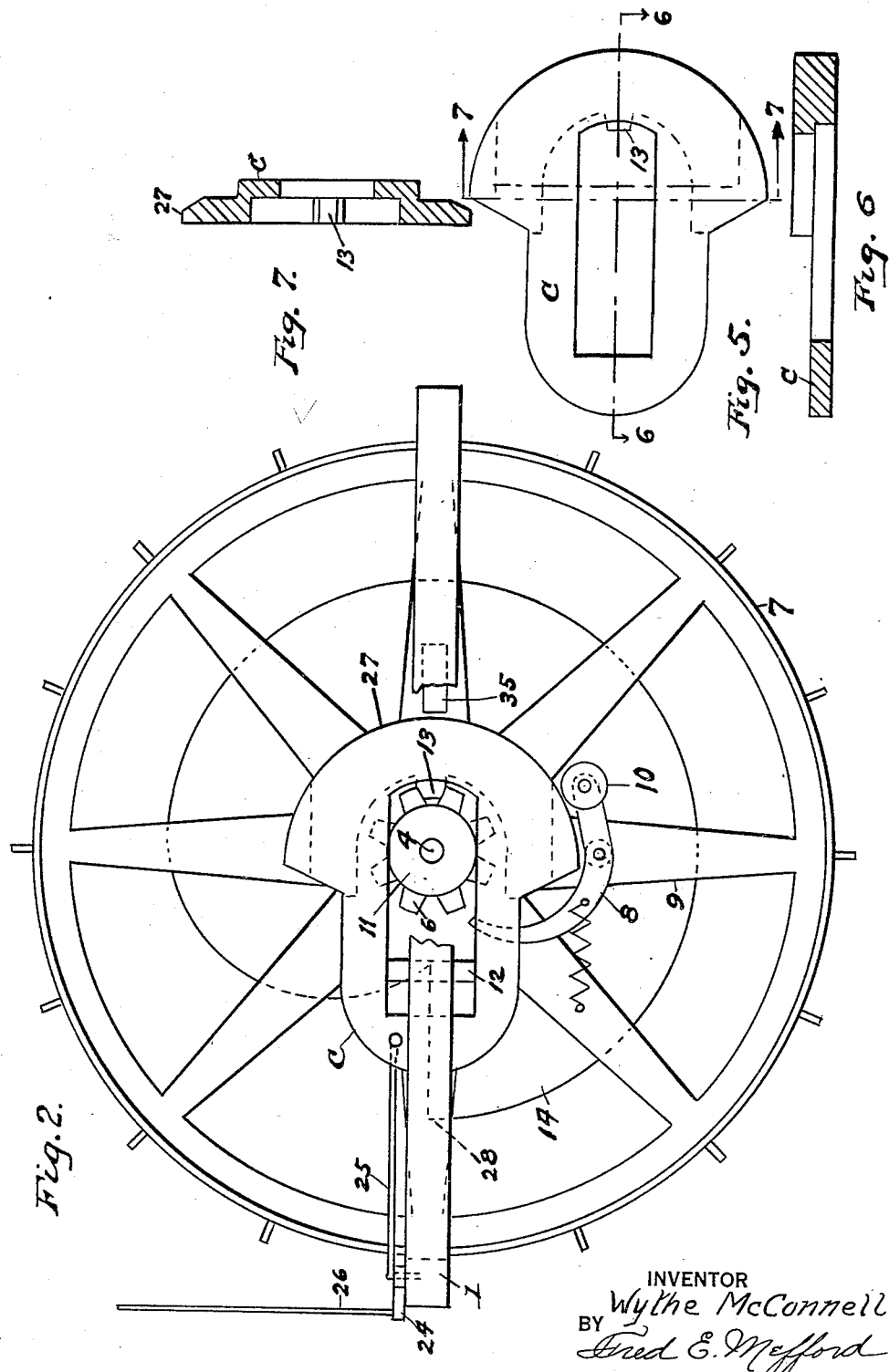
INVENTOR
Wythe McConnell
BY Fred E. Mefford
ATTORNEY

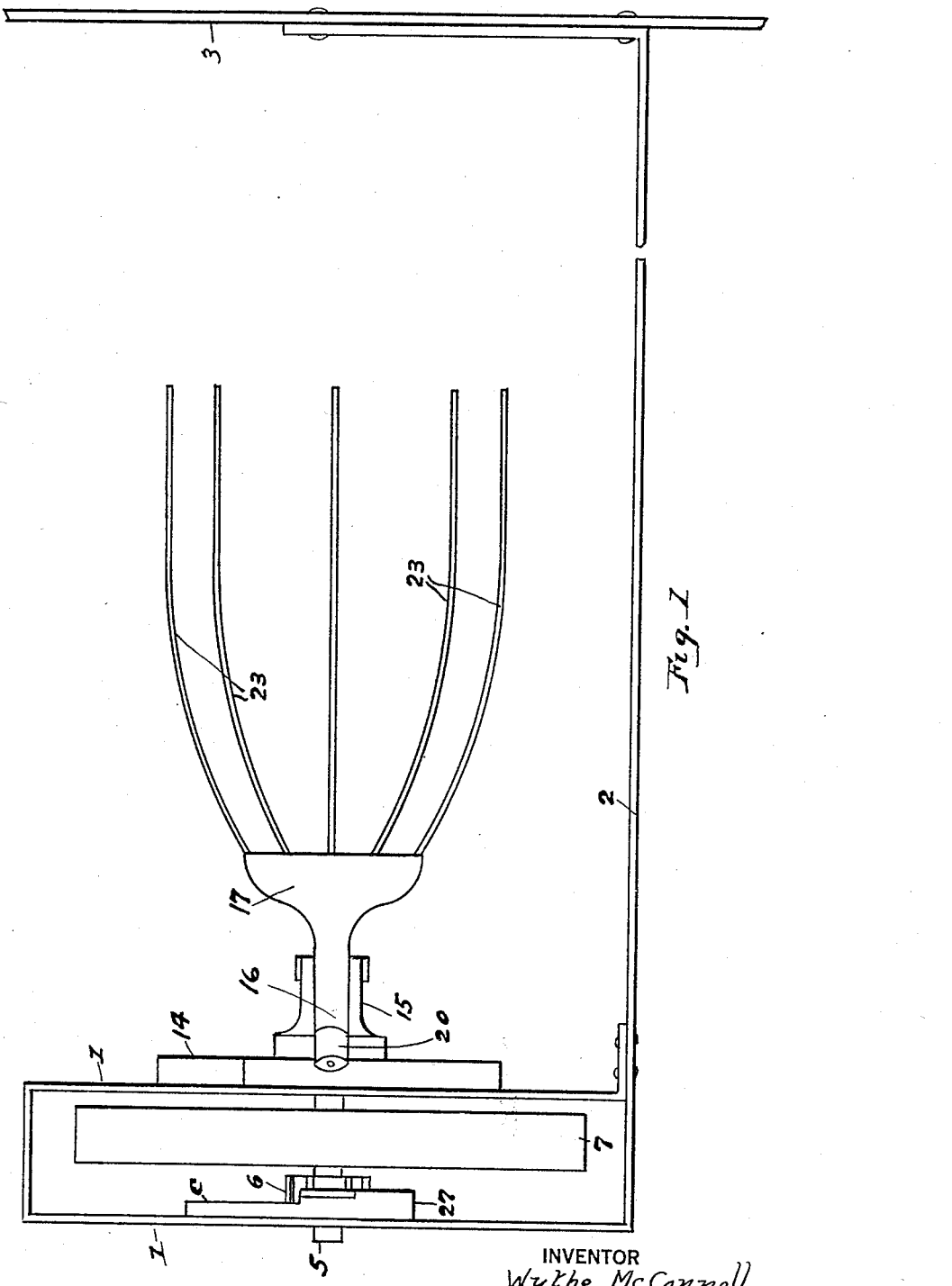

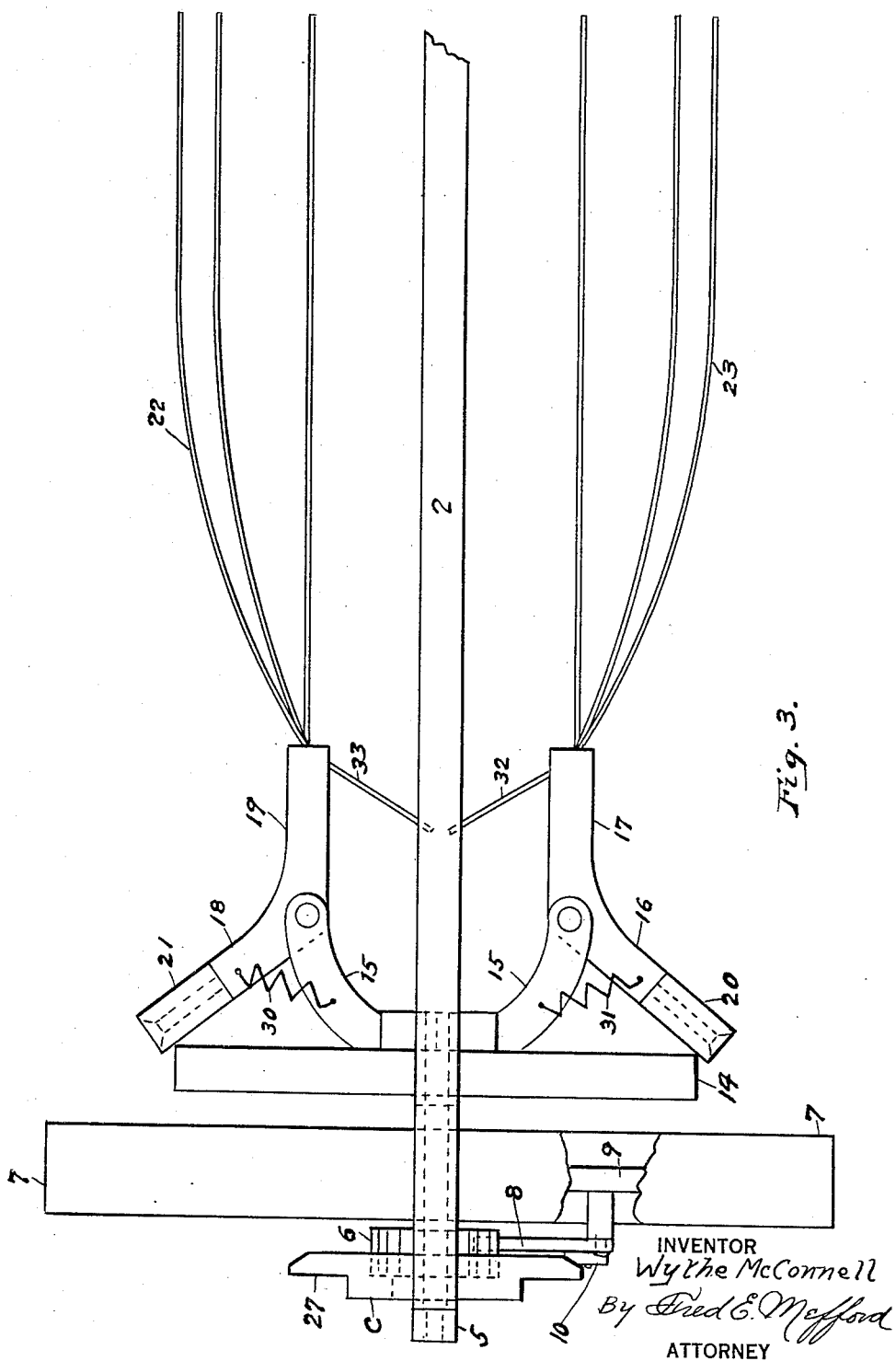

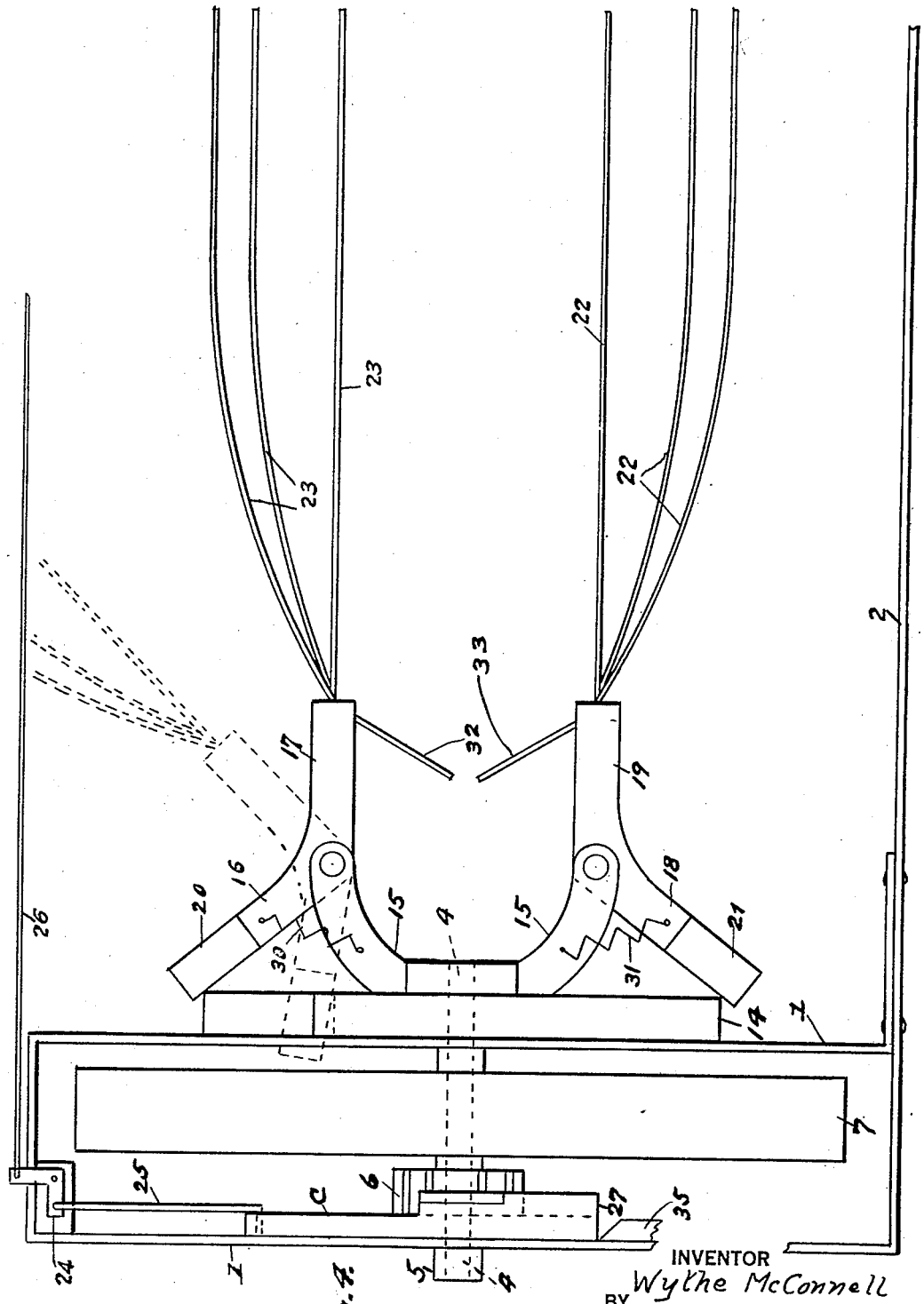

Patented May 19, 1931

1,806,407

UNITED STATES PATENT OFFICE

WYTHE McCONNELL, OF EL PASO COUNTY, COLORADO

SHOCKING ATTACHMENT FOR GRAIN BINDERS

Application filed August 20, 1929. Serial No. 387,160.

My invention relates to harvesting machines, more particularly to grain binders.

My object is to provide a shocking attachment which can be attached to the binder main frame in place of the regular bundle carrier.

Figure 1 represents a plan view of the attachment secured to a fragment of the binder main frame in place of the regular bundle carrier; Fig. 2, a side elevation drawn to an enlarged scale; Fig. 3, an end elevation showing the tines in the normal position; Fig. 4, a plan view showing the tines in the position to deposit the bundles on the ground; Fig. 5, an elevation of the intermittent cam member; Fig. 6, a sectional plan view on the line 6—6 in Fig. 5; and Fig. 7, a sectional elevation on the line 7—7 in Fig. 5.

Although I show the preferred embodiment of my invention, I do not thereby limit myself to the precise form shown, but wish it understood that within the scope of what hereinafter is claimed, various changes in the details of construction may be made without departing from the spirit of the invention.

A horizontally disposed rectangular frame 1 is provided with an extension bar 2 attached to the binder main frame 3 in place of the regular bundle carrier. A horizontally disposed axle 4 is journalled in bearings 5 in rectangular frame 1. A gear 6 is keyed on axle 4 and a traction wheel 7 is rotatably mounted on said axle. A dog 8 is pivoted on a spoke 9 of traction wheel 7 and carries an anti-friction roller 10. An intermittent cam member C is slidably mounted on the hub 11 of gear 6 and on lug 12 on frame 1. This intermittent cam member is provided with a lug 13 adapted to engage gear 6, and a semi-circular cam 27 adapted to cooperate with roller 10. A stationary cam 14 is rigidly mounted on frame 1. A yoke 15 is rigidly mounted on the end of axle 4 and carry a pair of diverging arms 16—17 in one end and a similar pair of arms 18—19 in the other end. Rollers 20—21 are mounted on arms 16 and 18, respectively and are adapted to cooperate with stationary cam 14. A plurality of curved tines 22 are mounted in arm 17 and extend towards the binder. A similar set of tines 23 are mounted in arm 19 and extend towards the binder. A bell crank 24 is pivoted at the rear of frame 1 and is connected to intermittent cam member C by a rod 25. A rod 26 extends from bell crank 24 to a point on the binder in reach of the driver's hand.

The tines are held in the normal position, shown in Figs. 1 and 3, by reason of the engagement of the lug 13 and gear 6. When in this position, the tines receive the bundles from the binder. When the desired number of bundles have been deposited between the two sets of tines 22 and 23, the driver pulls the rod 26 which operates the bell crank 24 which in turn pulls the rod 25 and slides the intermittent cam rearward thereby disengaging the lug 13 from the gear 6 and at the same time bringing the semi-circular cam 27 into the path of the roller 10. As the roller 10 rides the semi-circular cam 28 the free end of the dog 8 engages the gear 6. The gear 6 being keyed on the axle 4 carries the axle 4 around with the dog 8 and thereby revolves the yoke 15, arms 16—17—18—19 and the tines 22—23. When the tines have reached the position shown in Fig. 4, the roller 20 on arm 16 has reached the point 28 on the stationary cam 14. Any further movement causes the roller 20 to fly towards the center of the cam 14 and swing the arms 16—17 and tines 22 into the dotted position shown in Fig. 4. This action in conjunction with gravity permits the bundles to drop to the ground with the butts down. As the tines continue to revolve, the roller 20 travels the face 29 of the intermittent cam member C and thereby swings the tines 22 over the shock just formed. When the tines have again reached the normal position, the roller 10 on the dog 8 has left the semi-circular cam 28 and the driver pushes the rod 26 and slides the intermittent cam member back to normal, thereby moving the lug 13 into engagement with the gear 6 which holds the yoke, arms and tines in normal position until the intermittent cam member is again pulled rearward to disengage the lug 13 and bring the semi-circular cam into the path of the roller 10 on the dog 8. A spring 30 normally holds the dog 8 out of engagement with the gear 6 and springs 30—31 hold the rollers 20—21 against the stationary cam 14.

Tines 32—33 are mounted in arms 17—19, respectively, to prevent the bundles from catching in the yoke 15.

The intermittent cam member C is beveled at the upper and lower portions to permit the roller 10 to clear said portions when the lug 19 is in engagement with the gear 6. A wedge shaped lug 35 is secured to the frame 1. When the cam member C is slid out of engagement with gear 6, the lug 35 pushes member C towards the wheel 7 and causes the roller 10 to ride the entire semi-circle of the cam face.

Having thus described my invention, what I claim as new and desire to secure by Letters Patent is:

1. In combination with a grain binder; a horizontally disposed rectangular frame provided with an extension bar attached to the binder main frame; bearings in said rectangular frame; a horizontally disposed axle journalled in said bearings; a gear keyed on said axle; a traction wheel rotatably mounted on said axle; a dog pivoted on said wheel, adapted to engage said gear and provided with a roller; an intermittent cam member slidably mounted in said frame, provided with a lug adapted to engage said gear and a semi-circular cam adapted to engage said roller; a stationary cam rigidly mounted on said rectangular frame; a yoke rigidly mounted on said axle; a pair of diverging arms pivoted in each end of said yoke, one arm of each pair cooperating with said stationary cam and the other arm carrying a plurality of tines extending towards said binder.

2. A shocking attachment for grain binders, comprising a horizontally disposed rectangular frame provided with an extension bar adapted to be attached to the binder main frame; bearings in said rectangular frame; a horizontally disposed axle journalled in said bearings; a gear keyed on said axle; a traction wheel rotatably mounted on said axle; a dog pivoted on said wheel and adapted to engage said gear; a roller mounted on said dog; an intermittent cam member slidably mounted in said rectangular frame, said member being provided with a lug which normally engages said gear, and a semi-circular cam adapted to engage said roller when said lug is disengaged and cause said dog to engage said gear; a stationary cam rigidly secured to said rectangular frame; a yoke rigidly mounted on the end of said axle and provided with bearings in each end; a pair of diverging arms pivoted in said bearings in each end of said yoke, one arm of each pair being provided with a roller adapted to cooperate with said stationary cam and the other arm carrying a plurality of curved tines adapted to hold bundles; a bell crank pivoted on the rear of said rectangular frame; a rod connecting said intermittent cam member and said bell crank; and a rod connected to said bell crank for the use of the driver in operating said intermittent cam member.

3. A shocking attachment in combination with a grain binder, comprising a rectangular frame provided with an extension bar secured to the binder main frame; a horizontally disposed axle journalled in said rectangular frame; a gear keyed on said axle; a traction wheel rotatably mounted on said axle and provided with spokes; a dog, provided with an antifriction roller, pivoted on one spoke of said wheel; an intermittent cam member slidably mounted in said frame, said member being provided with a lug normally engaging said gear, and a semi-circular cam adapted to cooperate with said roller to cause said dog to engage said gear when said lug is disengaged; a stationary cam rigidly mounted on said rectangular frame; a yoke rigidly mounted on said axle; a pair of diverging arms pivoted in each end of said yoke, one arm of each pair being provided with antifriction rollers normally cooperating with said stationary cam to hold said arms in the vertical plane while said semi-circular cam is out of engagement with said roller on said dog and to swing the rear pair of arms while said semi-circular cam is in engagement with said roller on said dog; and said lug is out of engagement with said gear; curved tines extending from said arms, adapted to receive bundles from said binder; a bell crank pivoted on said rectangular frame; a rod connecting said intermittent cam member and said bell crank; and a rod connected to said bell crank whereby the driver operates said intermittent cam member.

4. A shocking attachment in combination with a grain binder, comprising a horizontally disposed rectangular frame provided with an extension bar connected to the binder main frame; bearings in said rectangular frame; a horizontally disposed axle journalled in said bearings; a traction wheel rotatably mounted on said axle; a gear keyed on said axle; a dog pivoted on said traction wheel and adapted to engage said gear; a spring connected to said traction wheel and said dog which normally holds said dog out of engagement with said gear; an intermittent cam member slidably mounted on the hub of said gear; a guide lug for said intermittent cam member, on said rectangular frame, said cam member being provided with a slot which fits over said gear hub and said guide lug, a semicircular cam portion adapted to engage the roller on said dog and cause said dog to engage said gear, and a lug adapted to engage said gear when said semi-circular cam portion is out of the path of said roller; means to operate said intermittent cam member; a yoke rigidly mounted on the end of said axle outside of said rectangular frame; a pair of diverging arms pivoted in each end of said yoke, one arm of each pair being provided with anti-friction rollers and the other arm provided with a plurality of curved tines extending towards said binder and adapted to receive bundles from said binder; a spring attached to each roller arm and to said yoke; a stationary cam secured to the outside of said rectangular frame, said cam being circular for approximately three fourths of its periphery and eccentrically curved for approximately one fourth of its periphery, the portion between the end of the circular portion and the beginning of the shortest radius of the eccentric portion being radial, said cam being adapted to cooperate with the rollers on the arms in said yoke.

5. In a shocking attachment for grain binders, the combination of a rectangular frame having an extension bar adapted to be attached to the binder; bearings in said rectangular frame; an axle disposed transversely of said rectangular frame and journalled in said bearings; a gear, having a hub, keyed on said axle; a traction wheel, having spokes, rotatably mounted on said axle; a dog, provided with a roller, pivoted on one spoke of said wheel; a spring connected to said dog and to said wheel to hold said dog out of engagement with said gear; a guide lug on said rectangular frame; an intermittent cam member, provided with a longitudinal slot, slidably mounted so that said slot works over said guide lug and the hub of said gear, said intermittent cam member including a semi-circular cam portion which cooperates with the roller on said dog to force said dog into engagement with said gear, and a lug which engages said gear when said cam portion is not in the path of said roller; and means to operate said intermittent cam member whereby the driver can throw said cam member into and out of engagement with said gear.

6. In a shocking attachment for grain binders, the combination of a rectangular frame provided with an extension bar adapted to be secured to a binder main frame; bearings in said rectangular frame; an axle journalled in said bearings; a yoke rigidly mounted on said axle; a pair of diverging arms pivoted in each end of said yoke; a plurality of curved tines mounted in one arm of each pair of arms and extending towards the binder when the attachment is secured to the binder; a stationary cam secured to said rectangular frame adjacent to said yoke and concentric with said axle, said cam being adapted to cooperate with the remaining arm of each pair to hold said arms in normal position for approximately three fourths of a revolution and then to guide one arm towards the center of said cam and to return said arm to the normal position during the remaining fourth revolution; and a traction wheel rotatably mounted on said axle.

7. In combination with a grain binder, a shocking attachment comprising a horizontally disposed rectangular frame having an extension bar secured to the binder main frame; bearings in said rectangular frame; an axle journalled in said rectangular frame; a gear, having a hub, keyed on said axle; a wheel rotatably mounted on said axle; a dog, provided with an anti-friction roller, pivoted to said wheel and adapted to engage said gear; a spring connected to said dog and said wheel whereby said dog is normally held out of engagement with said gear; an intermittent cam member, having a longitudinal slot, slidably mounted in said rectangular frame so that said slot works over the hub of said gear, said intermittent cam member being provided with a lug which normally engages said gear, and a semi-circular cam adapted to engage said roller when said lug is out of engagement with said gear and to force said dog into engagement with said gear so that said axle is caused to revolve with said wheel; a yoke rigidly mounted on said axle; a pair of diverging arms pivoted in each end of said yoke; a plurality of curved tines mounted in one arm of each pair of arms and extending towards said binder; a stationary cam rigidly mounted on said rectangular frame concentric with said axle, said cam being so shaped that it guides the remaining arm of each pair of arms while said axle is revolving so as to swing the cooperating arms in a circle for approximately three fourths of the revolution and to swing one of said arms rapidly towards the center and then gradually outward to normal in the remaining fourth of the revolution; and means to shift said intermittent cam member.

WYTHE McCONNELL.